US012668178B2

(12) United States Patent　　　(10) Patent No.:　US 12,668,178 B2

Ito et al.　　　(45) Date of Patent:　Jun. 30, 2026

(54) LOST ARTICLE PREVENTION DEVICE, LOST ARTICLE PREVENTION PROGRAM, AND LOST ARTICLE PREVENTION METHOD

(71) Applicant: Nissan Motor Co., Ltd., Kanagawa (JP)

(72) Inventors: Kota Ito, Kanagawa (JP); Kotaro Chiba, Kanagawa (JP); Takehiro Miyoshi, Kanagawa (JP); Tatsuomi Nakayama, Kanagawa (JP); Hideki Agata, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 238 days.

(21) Appl. No.: 18/570,930

(22) PCT Filed: Jun. 23, 2021

(86) PCT No.: PCT/JP2021/023825

§ 371 (c)(1),
(2) Date: Dec. 15, 2023

(87) PCT Pub. No.: WO2022/269814

PCT Pub. Date: Dec. 29, 2022

(65) Prior Publication Data

US 2024/0278718 A1　　Aug. 22, 2024

(51) Int. Cl.
*G06V 20/59*　　(2022.01)
*B60Q 9/00*　　(2006.01)
(Continued)

(52) U.S. Cl.
CPC ................ *B60Q 9/00* (2013.01); *E05B 81/56* (2013.01); *E05F 15/70* (2015.01); *G06V 20/52* (2022.01); *G06V 20/59* (2022.01)

(58) Field of Classification Search
None
See application file for complete search history.

(56) References Cited

U.S. PATENT DOCUMENTS 10,303,961 B1 *　5/2019　Stoffel ................... H04W 4/44
2016/0277023 A1　9/2016　Nakajima
(Continued)

FOREIGN PATENT DOCUMENTS

CN　　111976597 A　　11/2020
JP　　2009-20731 A　　1/2009
(Continued)

*Primary Examiner* — Todd Melton

(74) *Attorney, Agent, or Firm* — Osha Bergman Watanabe & Burton LLP

(57) ABSTRACT

A lost article prevention device includes a sensor, a communication device, and a controller. The sensor is configured to detect a state inside a vehicle cabin. The communication device is configured to receive alighting point information being information of an alighting point of a passenger. The controller is configured to determine whether or not a vehicle has arrived at the alighting point on a basis of the alighting point information, and determine whether or not a lost article of the passenger is present in the vehicle cabin on a basis of a detection result of the sensor. The controller releases a closed state of a door when the vehicle is determined to have arrived at the alighting point and the lost article is determined not to be present, and maintains the closed state of the door when the vehicle is determined to have arrived at the alighting point and the lost article is determined to be present.

15 Claims, 5 Drawing Sheets

(51)  Int. Cl.
   *E05B 81/56*          (2014.01)
   *E05F 15/70*          (2015.01)
   *G06V 20/52*          (2022.01)

(56)                    References Cited

U.S. PATENT DOCUMENTS

2017/0098364  A1       4/2017  Jaegal
2020/0005044  A1*      1/2020  Nakamura ............. G06V 20/52
2020/0145800  A1       5/2020  Ikemoto et al.
2020/0160075  A1       5/2020  Muiter et al.

FOREIGN PATENT DOCUMENTS

JP          2012-48412  A      3/2012
JP         2016-173299  A      9/2016
JP         2019-205078  A     11/2019

* cited by examiner

RIGHT

FRONT ⟷ REAR

LEFT

YOU'VE DROPPED YOUR PASS HOLDER. PLEASE CHECK UNDERFOOT.

YOU'VE DROPPED YOUR PASS HOLDER. PLEASE CHECK UNDERFOOT.

BEWARE OF ANYTHING LEFT BEHIND!

BEWARE OF ANYTHING LEFT BEHIND!

TO STEP S17 OF FIG. 8

LOST ARTICLE PREVENTION DEVICE, LOST ARTICLE PREVENTION PROGRAM, AND LOST ARTICLE PREVENTION METHOD

TECHNICAL FIELD

The present invention relates to a lost article prevention device, a lost article prevention program, and a lost article prevention method.

BACKGROUND ART

PTL 1 below discloses a technology for warning a passenger in a vehicle that there is an article left behind in the vehicle.

CITATION LIST

Patent Literature

PTL1: JP 2009-020731 A

SUMMARY OF INVENTION

Technical Problem

However, even if such a warning is issued, the passenger may alight the vehicle without noticing the warning.

It is an object of the present invention to reduce the occurrence of lost articles in vehicles.

Solution to Problem

According to an aspect of the present invention, there is provided a lost article prevention device including: a sensor configured to detect a state inside a vehicle cabin; a communication device configured to receive alighting point information being information of an alighting point of a passenger; and a controller configured to determine whether or not a vehicle has arrived at the alighting point on a basis of the alighting point information, and determine whether or not a lost article of the passenger is present in the vehicle cabin on a basis of a detection result of the sensor, wherein the controller releases a closed state of a door when the vehicle is determined to have arrived at the alighting point and the lost article is determined not to be present, and maintains the closed state of the door when the vehicle is determined to have arrived at the alighting point and the lost article is determined to be present.

Advantageous Effects of Invention

According to an aspect of the present invention, it is possible to reduce the occurrence of lost articles in vehicles.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

Configuration

Figure 1:
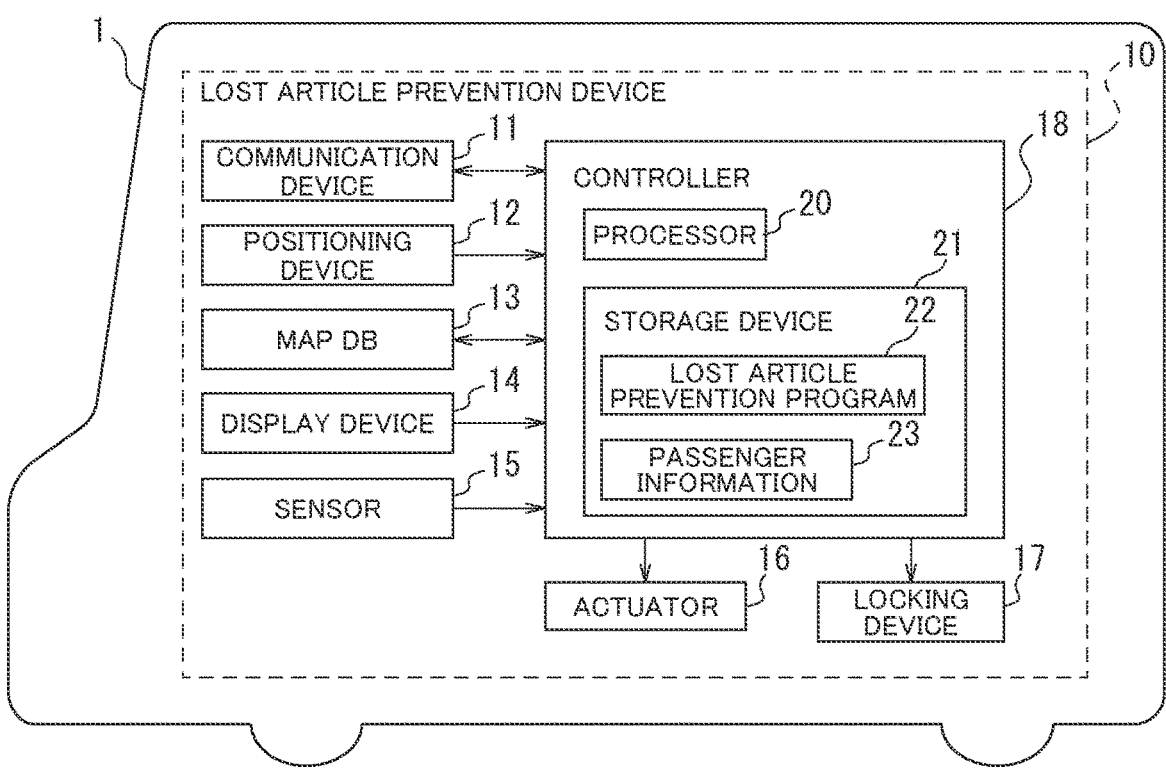
FIG. 1 is a schematic configuration diagram of an example of a vehicle including a lost article prevention device of an embodiment.

FIG. 1 is a schematic configuration diagram of an example of a vehicle including a lost article prevention device of an embodiment. A vehicle 1 is a service vehicle that is shared by a plurality of users in a transportation mobility service. The vehicle 1 may be a so-called demand-type vehicle that operates according to a user's request, and may be, for example, a robot taxi.

The vehicle 1 may be, for example, an electric vehicle including an electric motor as a drive source, an engine vehicle including an internal combustion engine as a drive source, or a hybrid vehicle including both an electric motor and an internal combustion engine as a drive source.

Additionally, the vehicle 1 may be a vehicle such as a bus for providing a transportation service, and may travel within a predetermined area according to a pre-established operation plan and allow users to board and alight at set stops according to user request information.

The vehicle 1 may be a self-driving vehicle capable of driving itself automatically according to conditions desired by a user and capable of transporting the user. In other words, the subject driving the vehicle 1 may be a travel control device capable of controlling the travel of the vehicle.

The vehicle 1 may be a manually driven vehicle. In other words, the subject driving the vehicle 1 may be a human (driver).

A user (hereinafter referred to as a "passenger") using the vehicle 1 inputs usage conditions for use of the vehicle 1 to a terminal device. For example, the passenger may pre-install dedicated application software (hereinafter referred to as "dedicated software") for using the transportation mobility service in the terminal device, and may input the usage conditions into the dedicated software.

The usage conditions include, for example, a boarding point where the passenger boards the vehicle 1 and a scheduled boarding time, and an alighting point where the passenger alights the vehicle 1. The terminal device includes a communication function, and transmits passenger information including information of the usage conditions input by the passenger and passenger identification information to a server device of a service center via a public communication network or the like.

The server device of the service center manages operation plans for a plurality of service vehicles, arranges the vehicle 1 according to the passenger's usage conditions transmitted from the terminal device of the passenger, and reserves one of passenger seats provided in the vehicle 1 for the passenger. When the server device completes the arrangement of the vehicle 1 and the reservation of the passenger seat, the server device transmits, to the vehicle 1, the passenger information of the passenger with the reserved seat information added.

The vehicle 1 that has received the passenger information is operated so as to arrive at a boarding point of the usage conditions included in the passenger information by the scheduled boarding time. The passenger moves on foot or uses a moving means such as a bicycle so as to arrive at the boarding point by the scheduled boarding time, and boards the vehicle 1.

As illustrated in FIG. 1, the vehicle 1 includes a lost article prevention device 10. The lost article prevention device 10 includes a communication device 11, a positioning device 12, a map database (denoted as "map DB" in the drawings) 13, a display device 14, a sensor 15, an actuator 16, a locking device 17, and a controller 18.

The communication device 11 provides a communication function between the lost article prevention device 10 and an external device. The communication method of the communication device 11 may be, for example, wireless communication using a public mobile communication network, inter-vehicle communication, road-to-vehicle communication, or satellite communication. In the present embodiment, the communication device 11 transmits and receives data to and from the server device of the service center. For example, the communication device 11 receives the passenger information of a passenger. Additionally, for example, the communication device 11 may transmit data and a control signal to the dedicated software installed on the terminal device possessed by the passenger via the server device of the service center.

The positioning device 12 measures a current position of the vehicle 1. The positioning device 12 may include, for example, a global navigation satellite system (GNSS) receiver. The GNSS receiver is, for example, a global positioning system (GPS) receiver or the like, and receives radio waves from a plurality of navigation satellites to measure the current position of the vehicle 1.

The map database 13 stores road map data. The road map data may be, for example, map data for a navigation system or high-definition map data suitable as a map for self-driving. The high-definition map is map data with higher definition than the map data for a navigation system, and includes lane-by-lane information that is more detailed than road-by-road information.

The display device 14 is an output device for presenting visual information to a passenger in a vehicle cabin of the vehicle 1. In the lost article prevention device 10, the display device 14 may be used to present various notifications (e.g., approaching or arrival at an alighting point, usage fees, neighborhood guidance, and warnings) to the passenger. In the present embodiment, the display device 14 is used to notify the passenger of the presence of a lost article of the passenger in the vehicle cabin and reminders to prevent the passenger from forgetting his or her belongings.

As used herein, a lost article is used as a term to mean both a left article and a dropped article. As used herein, a left article is a term used to mean an article possessed by a passenger at the time of boarding, which the passenger placed in the vehicle cabin intentionally away from his or her body, and which the passenger misplaced. Additionally, as used herein, a dropped article means an article possessed by a passenger at the time of boarding and unintentionally dropped by the passenger in the vehicle cabin.

In addition, the notification that informs that the lost article of the passenger is present in the vehicle cabin and the notification of the reminders to prevent the passenger from forgetting his or her belongings may be collectively referred to as a "lost article notification".

The sensor 15 is a device that detects a state inside the vehicle cabin of the vehicle 1. The sensor 15 is used to monitor the state inside the vehicle cabin or detect an object in the vehicle cabin. In the present embodiment, the sensor 15 is used to detect a lost article in the vehicle cabin.

The sensor 15 may be, for example, an in-vehicle surveillance camera or an object detection sensor that does not acquire an image, such as an infrared sensor or an ultrasonic sensor.

Figure 2:
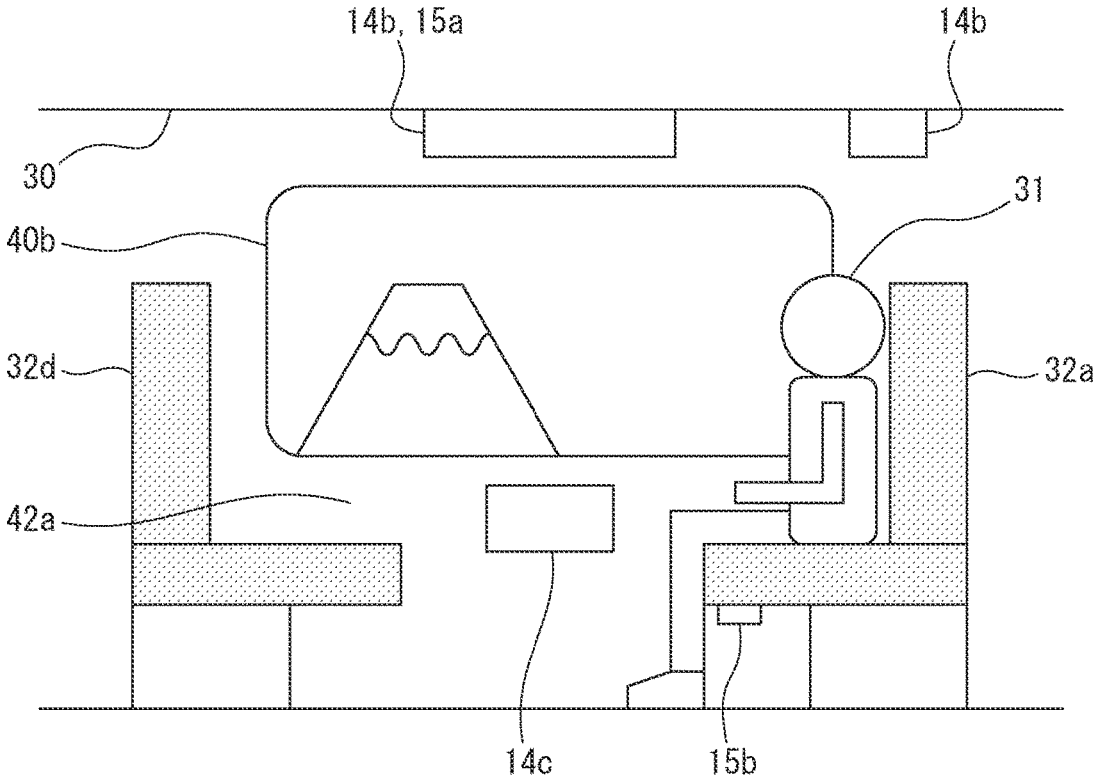
FIG. 2 is an illustrative diagram of an arrangement example of a display device and a sensor.

An arrangement example of the display device 14 and the sensor 15 is described with reference to FIG. 2. Reference sign 30 denotes a ceiling of the vehicle cabin of the vehicle 1, reference sign 31 denotes a passenger, reference sign 32a denotes a passenger seat to be used by the passenger 31 (i.e., a reserved seat for the passenger 31), reference sign 32d denotes a passenger seat other than the reserved seat 32a, reference sign 40b denotes a window (wind shield) of the passenger seats of the vehicle 1, and reference sign 42a denotes an interior trim near the passenger seats.

The display device 14 and the sensor 15 may be set on the ceiling of the vehicle cabin as the display device 14a and the sensor 15a integrated with lighting inside the vehicle cabin. The sensor 15a may be, for example, an in-vehicle surveillance camera or an object detection sensor.

The display device 14 may be set on the ceiling of the vehicle cabin as a stand-alone display device 14b. The display devices 14a and 14b may be, for example, projectors that project visual images onto the window of the vehicle 1.

Additionally, the display device 14 may be embedded in the trim 42a as a stand-alone display device 14c.

In addition, the sensor 15 may be provided under the passenger seat 32a as a sensor 15b that detects an object in a blind spot area of the sensor 15a. The sensor 15b may be, for example, an object detection sensor or a camera that acquires images.

In the following description, the display devices 14a to 14c may be collectively referred to as "display device 14", and the sensors 15a and 15b may be collectively referred to as "sensor 15".

Figure 3:
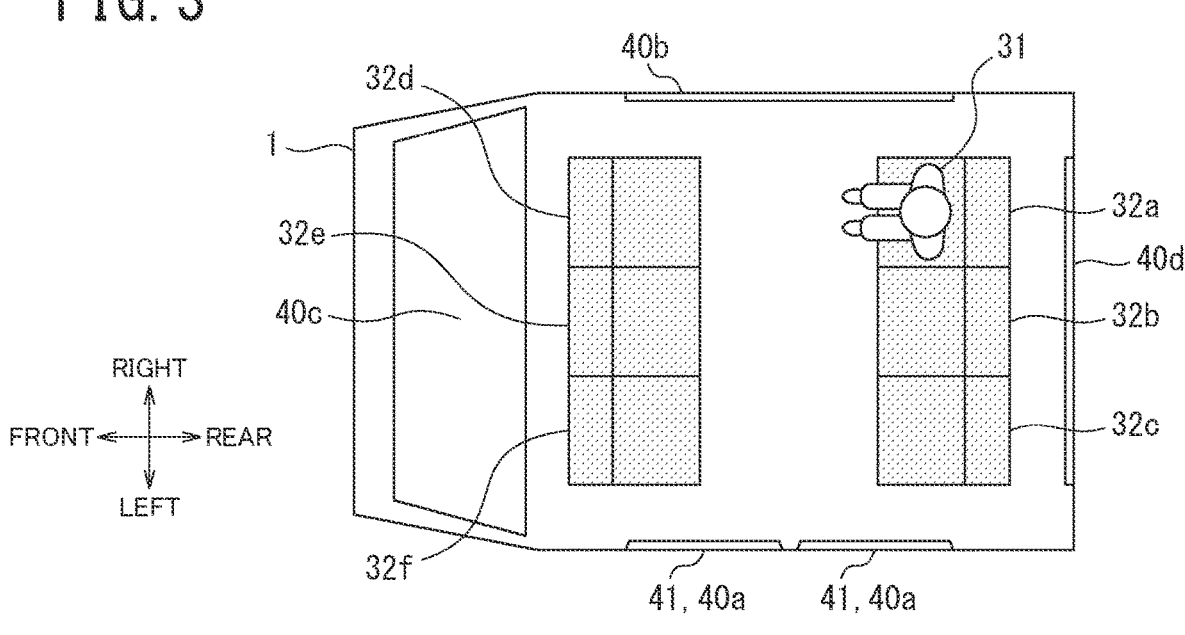
FIG. 3 is an illustrative diagram of examples of a window where a lost article notification is displayed.

FIG. 3 is an illustrative diagram of examples of a window where a lost article notification is displayed by the display device 14a or 14b. Reference signs 32b, 32c, 32e, and 32f denote passenger seats other than the reserved seat 32a, reference sign 41 denotes a boarding/alighting door that is used for boarding/alighting of the passenger 31, reference sign 40a denotes a widow embedded in the boarding/alighting door 41, reference sign 40c denotes a window embedded in a front portion of the vehicle 1, and reference sign 40d denotes a window embedded in a rear portion of the vehicle 1. The passenger seats 32a to 32f may be collectively referred to as "passenger seat 32". The windows 40a to 40d may be collectively referred to as "window 40".

For example, the notification of a lost article may be displayed on the window 40a embedded in the boarding/alighting door 41.

Additionally, for example, the notification of a lost article may be displayed on a window near the passenger 31 who should be notified of the lost article (i.e., the passenger who has boarded the vehicle 1 carrying the detected lost article). For example, if the passenger seat of the passenger 31 (the passenger seat 32a in the example of FIG. 3) is closer to the window 40b than the boarding/alighting door 41, the notification may be displayed on the window 40b.

If the passenger seat of the passenger 31 is closer to the boarding/alighting door 41 than the window 40b, the notification may be displayed, for example, on the window 40a embedded in the boarding/alighting door 41.

Note that FIG. 3 illustrates a case of the vehicle 1 traveling in an area where left-hand traffic is mandatory. In the case of a vehicle traveling in an area where left-hand traffic is mandatory, the boarding/alighting door 41 may be provided on a right side of the vehicle 1, and the passenger seat window 40b may be provided on a left side of the vehicle 1.

Additionally, for example, the notification of a lost article may be displayed on the window 40c embedded in the front portion of the vehicle 1 or the window 40d embedded in the rear portion of the vehicle 1.

Figure 4A:
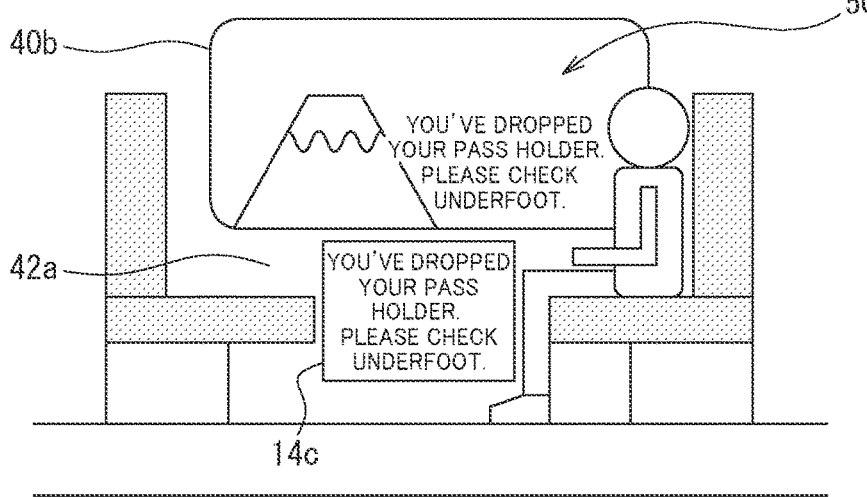
FIGS. 4A and 4B are diagrams illustrating examples of states where lost article notifications are displayed.
Figure 4B:
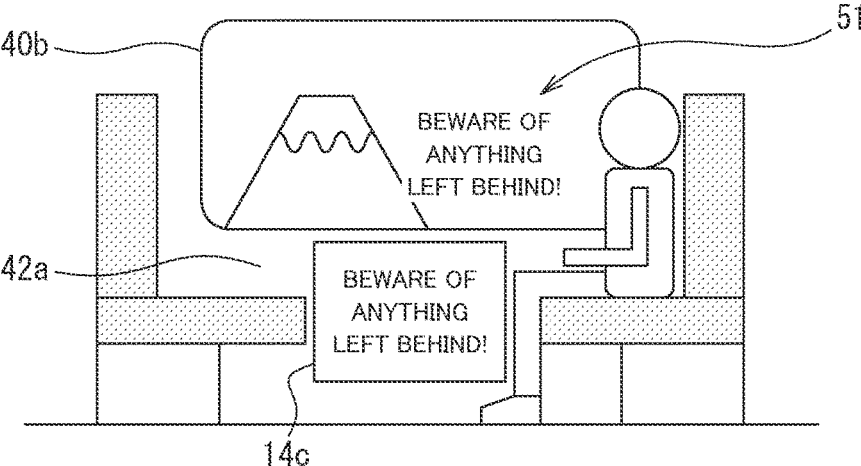

FIG. 4A is a diagram illustrating an example of a state where a dropped article notification is displayed, and FIG. 4B is a diagram illustrating an example of a state where a left article notification is displayed. For example, the display device 14 may project a visual image of a lost article (dropped article or left article) notification on the window 40b of the passenger seats, as indicated by arrows 50 and 51.

Alternatively, for example, the display device 14c embedded in the trim 42a may display the visual image of the lost article notification.

For example, when the window 40b of the passenger seats is closed, a visual image of a lost article (dropped article or left article) notification may be projected on the window 40b, and when the window 40b is open or the passenger seats have no windows, the visual image of the lost article notification may be displayed on the display device 14c embedded in the trim 42a. The same applies to the window 40a and the display device 14c embedded in the boarding/alighting door 41 that are described later with reference to FIG. 5.

The visual image of the lost article notification may include character information (text) for notifying the passenger 31 of the lost article, as illustrated in the drawing, and may include an image of the lost article captured by the sensor 15 or a diagram (illustration) representing the lost article. The same applies to the window 40a embedded in the boarding/alighting door 41 that is described later with reference to FIG. 5.

Additionally, when the visual image of the lost article notification is projected on the window 40b of the passenger seats as illustrated by arrows 50 and 51, the visual image may be displayed transparently. As used herein, displaying the visual image transparently means a state where, for example, a visual image is projected onto a transparent object such as a window glass, and a background of the transparent object can be seen through the projected visual image. The same applies to displaying a notification on the window 40a embedded in the boarding/alighting door 41 that is described below with reference to FIG. 5.

Figure 5:
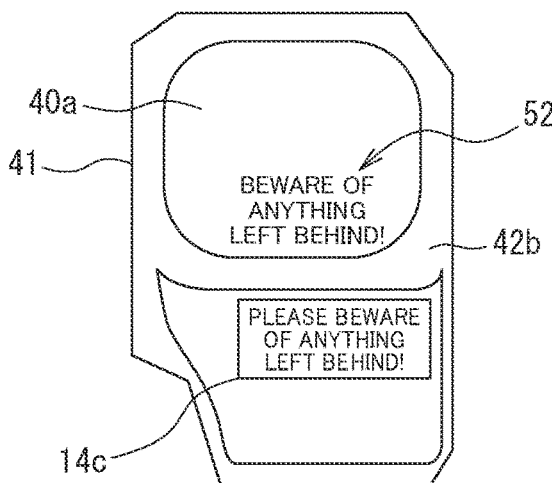
FIG. 5 is a diagram illustrating an example of a state where lost article notifications are displayed on a boarding/alighting door.

FIG. 5 is a diagram illustrating an example of a state where a lost article notification is displayed on the boarding/alighting door 41. Although FIG. 5 illustrates an example of a left article notification, a dropped article notification may be displayed as in FIG. 4A.

For example, the display device 14 may project a visual image of the lost article notification on the window 40a embedded in the boarding/alighting door 41, as indicated by an arrow 52. For example, the display device 14c embedded in the trim 42b of the boarding/alighting door 41 may display the visual image of the lost article notification.

FIGS. 6A to 6D are diagrams illustrating configuration examples of the window 40 on which a visual image of a lost article notification is projected.

A variety of existing configurations can be used to project the visual image of the lost article notification on the window 40.

Figure 6A:
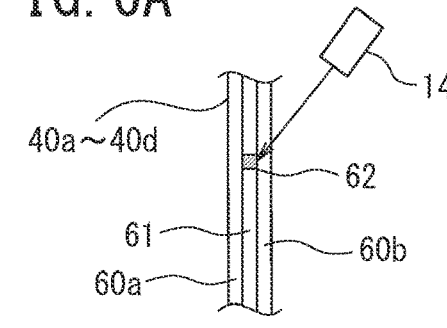
FIGS. 6A to 6D are diagrams illustrating configuration examples of a window where a visual image is projected.
Figure 6B:
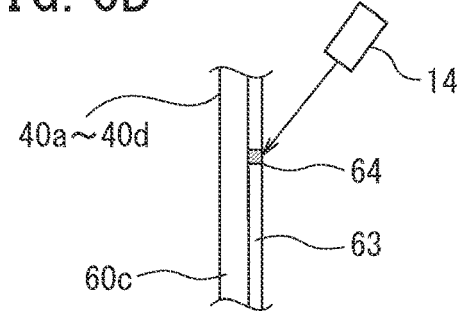

For example, the window 40 in FIG. 6A includes laminated glasses 60a and 60b and a transparent intermediate film 61 sandwiched between the laminated glasses 60a and 60b. The window 40 in FIG. 6B includes a glass 60c and a transparent film 63 attached to the glass 60c. The display device 14 projects the visual image of the lost article notification on the window 40 by forming the visual image of the lost article notification on the intermediate film 61 or on the film 63.

For example, the intermediate film 61 or the film 63 may include a material that emits light when irradiated with a light ray having a particular wavelength. When a light ray from the display device 14 is applied to a spot 62 on the intermediate film 61, the spot 62 emits light to form an image on the intermediate film 61. Similarly, when a light ray from the display device 14 is applied to a spot 64 on the film 63, the spot 64 may emit light to form an image on the film 63.

Figure 6C:
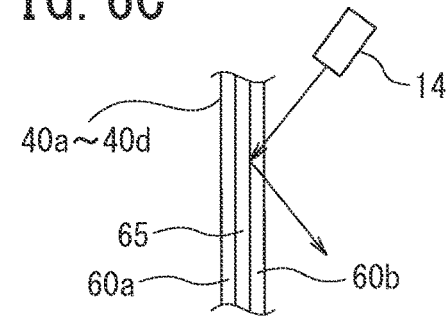
Figure 6D:
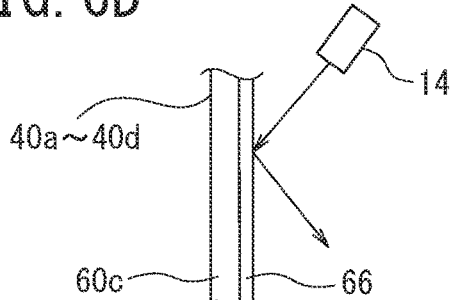

The window 40 in FIG. 6C includes laminated glasses 60a and 60b and a transparent intermediate film 65 sandwiched between the laminated glasses 60a and 60b. The window 40 in FIG. 6D includes a glass 60c and a transparent film 66 attached to the glass 60c. The display device 14 reflects the visual image on the intermediate film 65 or the film 66 to display the lost article notification.

For example, the intermediate film 65 or the film 66 may be a transparent member that reflects incident light obliquely by forming grooves on a surface thereof. Alternatively, for example, the intermediate film 65 or the film 66 may be a transparent member that reflects incident light obliquely by laminating materials with different refractive indices or coating with high refractive index nanoparticles.

Figure 6E:
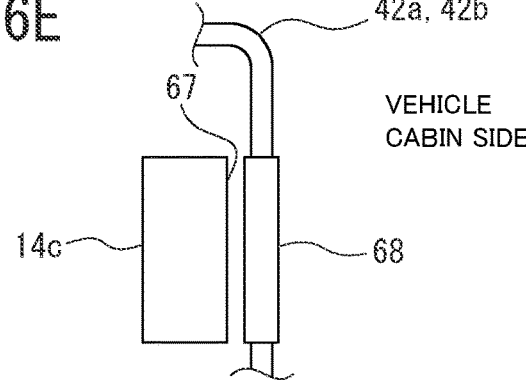
FIG. 6E is a diagram illustrating a configuration example of a trim in which a display device is embedded.

FIG. 6E is a diagram illustrating a configuration example of the trims 42a and 42b in which the display device 14c is embedded. Hereinafter, the interior trim 42a near the passenger seats and the trim 42b of the boarding/alighting door 41 may be collectively referred to as "trim 42".

The display device 14c includes a display screen 67 for displaying visual images, and displays a lost article notification on the display screen 67. The trim 42 includes a transmissive layer 68 on a surface thereof that transmits visible light, and the visual image displayed on the display screen 67 of the display device 14c is transmitted through the transmissive layer 68 to present the lost article notification to the passenger 31.

Refer to FIG. 1. The actuator 16 opens or closes the boarding/alighting door 41 according to a control signal from the controller 18. The locking device 17 locks or unlocks the boarding/alighting door 41 in response to a control signal from the controller 18.

The controller 18 is an electronic control unit (ECU) for controlling the lost article prevention device 10, and incudes a processor 20 and peripheral components such as a storage device 21. The processor 20 may be, for example, a central processing unit (CPU) or a micro-processing unit (MPU). The storage device 21 may include non-transitory tangible storage media such as registers, cache memory, and memories such as read only memory (ROM) and random access memory (RAM) used as main memory.

The storage device 21 stores a lost article prevention program 22 and passenger information 23 received from the server device of the service center via the communication device 11.

Functions of the controller 18 described below are realized, for example, by causing the processor 20 to execute the lost article prevention program 22.

Figure 7:
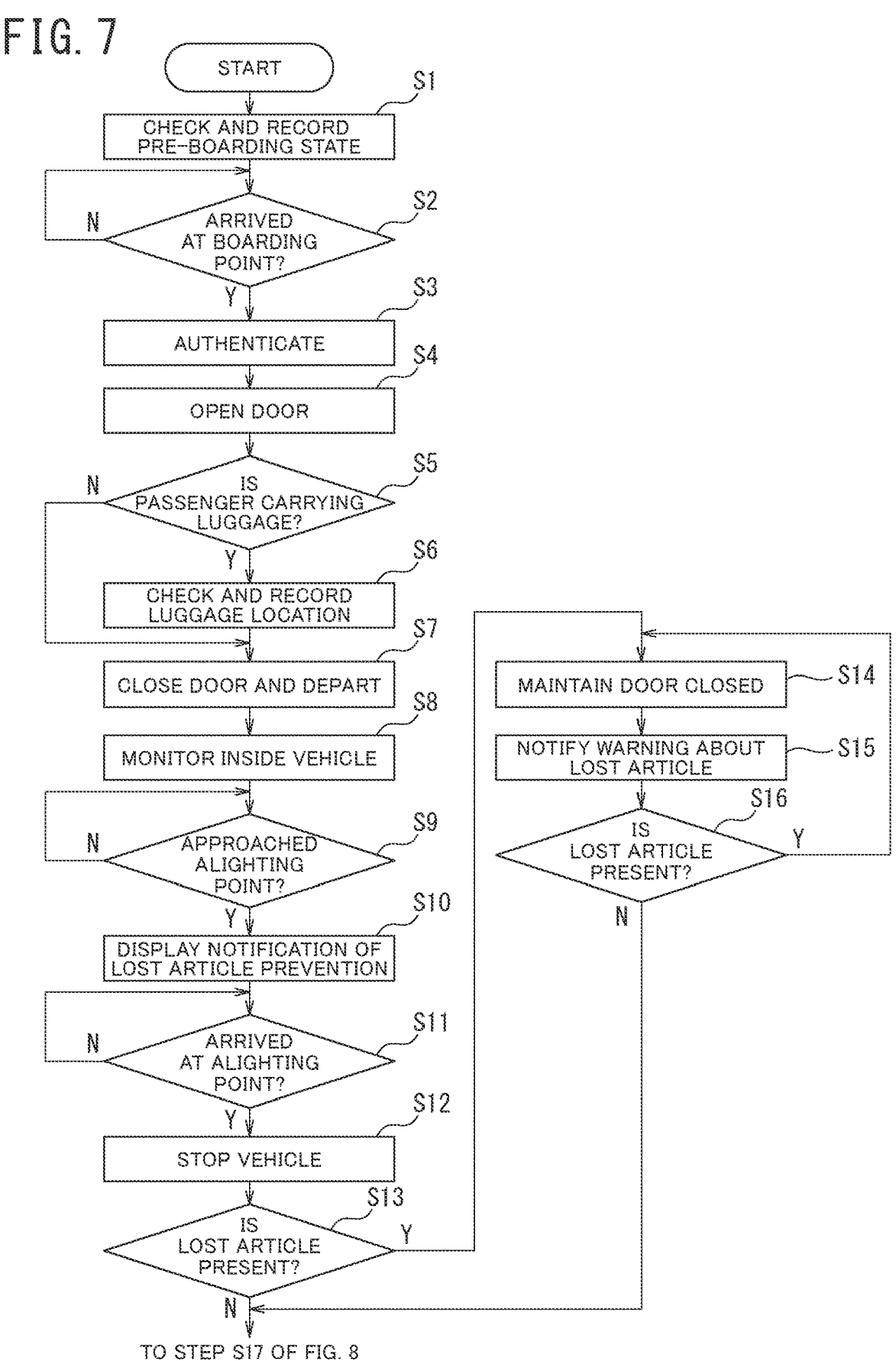
FIG. 7 is a flowchart of an example of a lost article prevention method of an embodiment.
Figure 8:
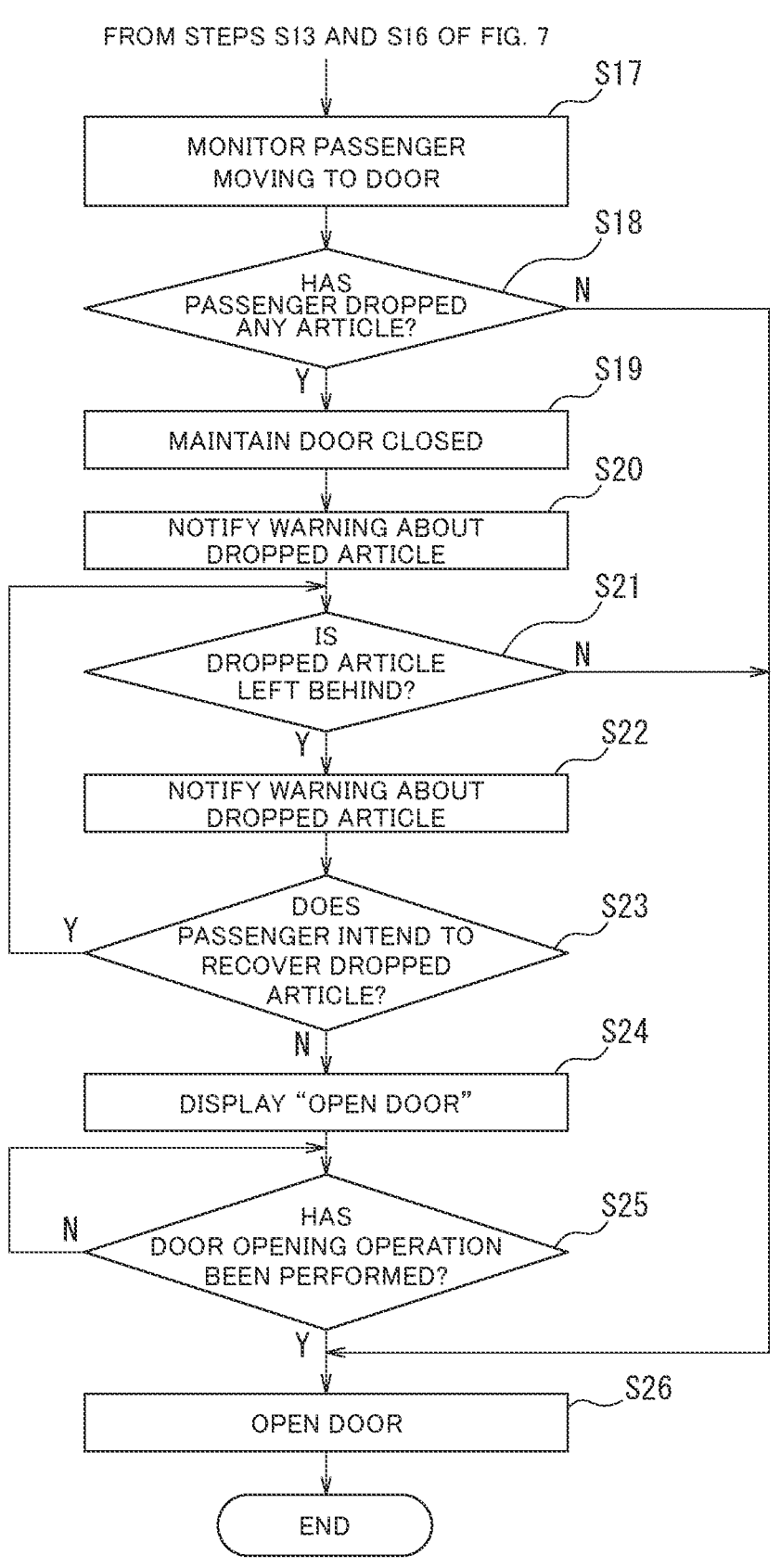
FIG. 8 is a flowchart of an example of the lost article prevention method of the embodiment.

Next, operation of the lost article prevention device 10 is described. FIGS. 7 and 8 are flowcharts of an example of a lost article prevention method of an embodiment. Hereinafter, an example of a case where the vehicle 1 is a self-driving vehicle is described. When the vehicle 1 is a manually operated vehicle, it is the same except that a human (driver) is the subject who executes steps related to driving the vehicle 1.

At step S1, the controller 18 receives the passenger information 23 from the server device of the service center. The controller 18 acquires information on the boarding point, scheduled boarding time, alighting point, and reserved seat 32a of the passenger 31 from the passenger information 23. When the passenger information 23 is received, the vehicle 1 is operated so as to arrive at the boarding point by the scheduled boarding time. While the vehicle 1 is on the move until it arrives at the boarding point, the controller 18 checks the state of an area around the reserved seat 32a (i.e., whether or not there is any article left around the reserved seat 32a) using the sensor 15, and stores, in the storage device 21, information of the state around the reserved seat 32a before the passenger 31 boards the vehicle 1 as pre-boarding information.

At step S2, the controller 18 determines whether or not the vehicle 1 has arrived at the boarding point on the basis of a current position of the vehicle 1 measured by the positioning device 12 and road map data of the map database 13. If the vehicle 1 has arrived at the boarding point (step S2: Y), processing proceeds to step S3. If the vehicle 1 has not arrived at the boarding point (step S2: N), processing returns to step S2.

At step S3, the controller 18 authenticates the passenger 31. For example, the passenger 31 is authenticated when dedicated software is operated on a terminal device possessed by the passenger 31. Alternatively, for example, the passenger 31 may be authenticated by biometric authentication.

Upon completion of the authentication of the passenger 31, the controller 18 controls the actuator 16 to open the boarding/alighting door 41 at step S4.

At step S5, the controller 18 uses the sensor 15 to recognize luggage of the passenger 31 when the passenger 31 boards the vehicle 1. If the passenger 31 is carrying luggage (step S5: Y), processing proceeds to step S6. If the passenger 31 is carrying no luggage (step S5: N), processing proceeds to step S7.

At step S6, when the passenger 31 sits on the reserved seat 32a, the controller 18 uses the sensor 15 to recognize where the passenger 31 has placed the luggage, and stores the luggage placed by the passenger 31 and a location of the placed luggage in the storage device 21 as pre-departure information. For example, the controller 18 recognizes that the passenger 31 has placed a bag on an empty seat and an umbrella under the reserved seat 32a, and stores as pre-departure information.

At step S7, the controller 18 controls the actuator 16 to close the boarding/alighting door 41. The controller 18 may control the locking device 17 to lock the boarding/alighting door 41. After that, the vehicle 1 departs to the alighting point.

While the vehicle 1 is moving to the alighting point, the controller 18 uses the sensor 15 to monitor conditions inside the vehicle cabin at step S8. At this time, the controller 18 uses the sensor 15 to recognize whether or not the passenger 31 has dropped any article. If the passenger 31 has dropped any article, the controller 18 recognizes whether or not the passenger 31 has noticed the dropped article. For example, the controller 18 may recognize whether or not the passenger 31 has noticed the dropped article on the basis of the line of sight and behavior of the passenger 31 when he or she dropped the article. If the passenger 31 is unaware of the dropped article, the sensor 15 is used to monitor a location of the dropped article.

At step S9, the controller 18 determines whether or not the vehicle 1 has approached the alighting point on the basis of the current position of the vehicle 1 measured by the positioning device 12 and the road map data of the map database 13. For example, if the vehicle 1 is estimated to arrive at the alighting point within a threshold time (e.g., several minutes), the vehicle 1 may be determined to have approached the alighting point. Alternatively, for example, if the vehicle 1 has approached a threshold distance (e.g., 2 to 3 km) from the alighting point, the vehicle 1 may be determined to have approached the alighting point. If the vehicle 1 has approached the alighting point (step S9: Y), processing proceeds to step S10. If the vehicle 1 has not approached the alighting point (step S9: N), processing returns to step S9.

At step S10, the controller 18 causes the display device 14 to display a notification for lost article prevention on a window or trim near the passenger 31. For example, if the reserved seat 32a of the passenger 31 is closer to the window 40b of the passenger seats than the boarding/alighting door 41, the notification may be displayed on the window 40b and on the display device 14c embedded in the interior trim 42a near the passenger seats, as illustrated in FIGS. 4A and 4B.

If the passenger seat of the passenger 31 is closer to the window 40a of the boarding/alighting door 41 than the window 40b of the passenger seat, the notification may be displayed on the window 40a and the display device 14c embedded in the trim 42b of the boarding/alighting door 41, as illustrated in FIG. 5.

In this case, if the passenger 31 has dropped any article, a dropped article notification may be displayed as illustrated in FIG. 4A. Additionally, if the passenger 31 has placed the luggage away from his or her body, a notification may be displayed to remind the passenger 31 not to forget anything, as illustrated in FIG. 4B and FIG. 5.

The controller 18 may give the notification of a lost article to the passenger 31 by vibrating the terminal device possessed by the passenger 31. For example, the controller 18 may vibrate the terminal device by transmitting a control signal to the dedicated software installed on the terminal device.

At step S11, the controller 18 determines whether or not the vehicle 1 has arrived at the alighting point on the basis of the current position of the vehicle 1 measured by the positioning device 12 and the road map data of the map database 13. If the vehicle 1 has arrived at the alighting point (step S11: Y), processing proceeds to step S12. If the vehicle 1 has not arrived at the alighting point (step S11: N), processing returns to step S11. At step S12, the vehicle 1 stops at the alighting point.

At step S13, the controller 18 determines whether or not the passenger 31 has left the passenger seat 32a (or whether or not the passenger 31 has stood up). If the passenger 31 has left the passenger seat 32a (or the passenger 31 has stood up), the controller 18 determines whether or not there is any lost article in the vehicle cabin. For example, the controller 18 uses the pre-boarding information and the pre-departure information stored in the storage device 21 and the sensor 15 to determine whether or not there is any lost article in the vehicle cabin.

For example, the controller 18 may recognize a current state inside the vehicle cabin by the sensor 15 and compare a recognition result of the current state inside the vehicle cabin with the pre-boarding information and the pre-departure information to determine whether or not there is any lost article in the vehicle cabin. For example, if an article not recorded in the pre-boarding information but recorded in the pre-departure information is still recognized, it may be determined that there is a lost article (left article) in the vehicle cabin.

Additionally, if the dropped article recognized at step S8 is still in the vehicle cabin without being recovered by the passenger 31, it may be determined that there is a lost article (dropped article) in the vehicle cabin.

If there is a lost article in the vehicle cabin (step S13: Y), processing proceeds to step S14. If there is no lost article in the vehicle cabin (step S13: N), processing proceeds to step S17.

At step S14, the controller 18 maintains the boarding/alighting door 41 closed. The controller 18 may maintain the boarding/alighting door 41 locked by the locking device 17.

At step S15, the controller 18 displays a lost article notification for informing that a lost article (left article or dropped article) is present in the vehicle cabin on the window 40a of the boarding/alighting door 41 or on the display device 14c embedded in the trim 42b.

At step S16, the controller 18 determines whether or not the lost article is left behind in the vehicle cabin. If the lost article is not left behind in the vehicle cabin because the passenger 31 has recovered the lost article (step S16: N), proceeding proceeds to step S17. If the lost article is left behind in the vehicle cabin (step S16: Y), processing returns to step S14.

At step S17, the controller 18 uses the sensor 15 to monitor the passenger 31 as he or she moves from the passenger seat 32a to the boarding/alighting door 41 and recognize whether or not the passenger 31 has dropped any article. If the passenger 31 has dropped any article (step S18: Y), processing proceeds to step S19. If the passenger 31 has not dropped any article (step S18: N), processing proceeds to step S26.

At step S19, the controller 18 maintains the boarding/alighting door 41 closed. The controller 18 may maintain the boarding/alighting door 41 locked by the locking device 17.

At step S20, the controller 18 displays a lost article notification that informs the presence of the dropped article in the vehicle cabin on the window 40a of the boarding/alighting door 41 or on the display device 14c embedded in the trim 42b.

At step S21, the controller 18 determines whether or not the dropped article is left behind in the vehicle cabin. If the passenger 31 has recovered the dropped article and the dropped article is not left behind in the vehicle cabin (step S21: N), processing proceeds to step S26. If the passenger 31 has not recovered the dropped article or has newly dropped any article and the dropped article is left behind in the vehicle cabin (step S21: Y), processing proceeds to step S22.

At step S22, a lost article notification that informs the presence of the dropped article in the vehicle cabin is displayed on the window 40a of the boarding/alighting door 41 or on the display device 14c embedded in the trim 42b.

At step S23, the controller 18 estimates whether or not the passenger 31 intends to recover the dropped article. For example, the controller 18 may estimate whether or not the passenger 31 intends to recover the dropped article on the basis of a behavior of the passenger recognized by the sensor 15. For example, if the passenger 31 does not attempt to recover the dropped article despite having seen a notification of the dropped article, it may be determined that the passenger 31 does not intend to recover the dropped article. Additionally, for example, if the passenger 31 turns his or her gaze in a direction of the dropped article but does not attempt to recover the dropped article, it may be determined that the passenger 31 does not intend to recover the dropped article.

If the passenger 31 is estimated to intend to recover the dropped article (step S23: Y), processing returns to step S21. If the passenger 31 is estimated not to intend to recover the dropped article (step S23: N), processing proceeds to step S24.

At step S24, the controller 18 displays a graphical user interface (GUI) that receives an operation for opening the boarding/alighting door 41 on the window 40a of the boarding/alighting door 41. For example, an image of a button with a text "Open Door" is displayed on the window 40a of the boarding/alighting door 41.

At step S25, the controller 18 determines whether or not the passenger 31 has performed a door opening operation (e.g., an operation of pressing the button with the text "Open Door") on the GUI displayed on the window 40a. If the door opening operation has been performed, processing proceeds to step S26. If the door opening operation has not been performed, processing returns to step S25.

At step S26, the controller 18 controls the locking device 17 to unlock the boarding/alighting door 41. Then, the actuator 16 is controlled to open the boarding/alighting door 41. After that, processing ends.

(Effects of Embodiment)

(1) The sensor 15 detects a state inside the vehicle cabin. The communication device 11 receives alighting point information that is information of an alighting point of the passenger. The controller 18 determines whether or not the vehicle has arrived at the alighting point on the basis of the alighting point information, and determines whether or not a lost article of the passenger is present in the vehicle cabin on a basis of a detection result of a sensor 15, in which the controller 18 releases a closed state of the boarding/alighting door 41 (i.e., opens the boarding/alighting door 41) when the vehicle is determined to have arrived at the alighting point and the lost article is determined not to be present, and maintains the closed state of the boarding/alighting door 41 when the vehicle is determined to have arrived at the alighting point and the lost article is determined to be present.

This provides the passenger with an opportunity to notice the lost article, which thus can reduce the occurrence of lost articles in the vehicle.

(2) The controller 18 may maintain the boarding/alighting door 41 locked when maintaining the closed state of the door. This can prevent the passenger from manually opening the boarding/alighting door 41 and alighting the vehicle without noticing the lost article.

(3) The controller 18 may open the boarding/alighting door 41 from the closed state when it is determined that the lost article is not present, after having determined that the vehicle has arrived at the alighting point and that the lost article is present and having maintained the closed state of the boarding/alighting door 41. This allows the boarding/alighting door 41 to be opened when the passenger recovers the lost article.

(4) The controller 18 may notify the passenger of the presence or absence of the lost article. This allows the passenger to be warned about the lost article, and also notified that the boarding/alighting door 41 remains closed due to the lost article.

(5) The controller 18 may notify the presence of the lost article when the vehicle is estimated to arrive at the alighting point within a threshold time or approaches a threshold distance from the alighting point. This can suppress the notification of a lost article until the vehicle approaches the alighting point, so that annoyance to the passenger can be avoided.

(6) The controller 18 determines whether or not the passenger intends to recover the lost article after having notified the presence of the lost article, and may open the door from the closed state when the passenger is determined not to intend to recover the lost article. This can prevent the passenger from being prevented from alighting the vehicle even though he or she does not intend to recover the lost article.

(7) The controller 18 may cause the display device 14 to display the notification of the lost article. Displaying the lost article notification is less likely to disturb the inside of the vehicle cabin than an audio notification.

(8) The display device 14 may transparently display the visual image on a glass of a window around a seat of the passenger or on a glass of the boarding/alighting door 41. Displaying on the glass of the boarding/alighting door 41 can ensure that the passenger is notified when alighting the vehicle. Additionally, transparently displaying the notification of the lost article can be notified without disturbing a scenery seen from a vehicle window as much as possible.

(9) The display device 14 may form the visual image on the glass or reflect the visual image on the glass. This allows transparent display of the lost article.

(10) The display device 14 may display the visual image on a trim near the window or on a trim of the boarding/alighting door 41. This allows the notification of the lost article to be displayed even when the window is open or no window glass is provided.

(11) The controller 18 may determine whether or not the passenger has left the seat, and cause the display device 14 to display the notification of the lost article on the window of the seat when the passenger has not left the seat, and cause the display device 14 to display the notification of the lost article on the boarding/alighting door 41 when the passenger has left the seat. As a result, while warning about the lost article by displaying the notification of the lost article on the window of the seat before the passenger leaves the seat, the notification of the lost article can be displayed on the boarding/alighting door 41 once the passenger has left the seat, which can further emphasize the notification of the lost article.

(12) The display device 14 may display the visual image including an image or diagram of the lost article. This makes it easier for the passenger to recognize the lost article.

(13) The controller 18 may cause the communication device 11 to transmit a signal to a terminal device possessed by the passenger and vibrate the terminal device to notify the lost article. This makes it easier for the passenger to notice the lost article.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

10: Lost article prevention device
11: Communication device
12: Positioning device
13: Map database
14, 14a to 14c: Display device
15, 15a, 15b: Sensor
16: Actuator
17: Locking device
18: Controller
20: Processor
21: Storage device
22: Lost article prevention program
23: Passenger information
31: Passenger
32, 32a to 32f: Passenger seat
40, 40a to 40d: Window
41: Boarding/alighting door
42, 42a, 42b: Trim
60a to 60c: Glass
61, 65: Intermediate film
63, 66: Film
67: Display screen
68: Transmissive layer

The invention claimed is:

1. A lost article prevention device comprising:
a sensor configured to detect a state inside a vehicle cabin;
a communication device configured to receive alighting point information being information of an alighting point of a passenger; and
a controller configured to determine whether or not a vehicle has arrived at the alighting point on a basis of the alighting point information, and determine whether or not a lost article of the passenger is present in the vehicle cabin on a basis of a detection result of the sensor,
wherein when the vehicle is determined to have arrived at the alighting point and the lost article is determined to be present, the controller estimates whether or not the passenger intends to recover the lost article based on a behavior of the passenger detected by the sensor, including whether or not a gaze of the passenger is directed toward the lost article, and
wherein the controller maintains a closed state of a door when the passenger is estimated to intend to recover the lost article, and releases the closed state of the door when the passenger is estimated not to intend to recover the lost article, and
wherein the controller releases the closed state of the door when the vehicle is determined to have arrived at the alighting point and the lost article is determined not to be present.

2. The lost article prevention device according to claim 1, wherein the controller maintains the door locked when maintaining the closed state of the door.

3. The lost article prevention device according to claim 1, wherein the controller opens the door from the closed state when it is determined that the lost article is not present, after having determined that the vehicle has arrived at the alighting point and that the lost article is present and having maintained the closed state of the door.

4. The lost article prevention device according to claim 1, wherein the controller notifies the passenger of a presence or absence of the lost article.

5. The lost article prevention device according to claim 4, wherein the controller notifies the presence of the lost article when the vehicle is estimated to arrive at the alighting point within a threshold time or approaches a threshold distance from the alighting point.

6. The lost article prevention device according to claim 5, comprising a display device configured to display a visual image in the vehicle cabin, wherein the controller causes the display device to display the notification of the lost article.

7. The lost article prevention device according to claim 6, wherein the display device transparently displays the visual image on a glass of a window around a seat of the passenger or on a glass of the door.

8. The lost article prevention device according to claim 7, wherein the display device forms the visual image on the glass or reflects the visual image on the glass.

9. The lost article prevention device according to claim 7, wherein the controller determines whether or not the passenger has left the seat, and causes the display device to display the notification of the lost article on the window of the seat when the passenger has not left the seat, and causes the display device to display the notification of the lost article on the door when the passenger has left the seat.

10. The lost article prevention device according to claim 6, wherein the display device displays the visual image on a trim near the window or on a trim of the door.

11. The lost article prevention device according to claim 6, wherein the display device displays the visual image including an image or diagram of the lost article.

12. The lost article prevention device according to claim 5, wherein the controller causes the communication device to transmit a signal to a terminal device possessed by the passenger and vibrate the terminal device to notify the lost article.

13. The lost article prevention device according to claim 1, wherein the sensor is a sensor configured to detect a lost article in the vehicle cabin.

14. A non-transitory computer-readable medium storing a lost article prevention program for causing a controller to execute:

acquiring alighting point information from a communication device configured to receive the alighting point information being information of an alighting point of a passenger;

determining whether or not a lost article of the passenger is present in a vehicle cabin on a basis of a detection result of a sensor configured to detect a state inside the vehicle cabin;

determining whether or not a vehicle has arrived at the alighting point on a basis of the alighting point information;

when the vehicle is determined to have arrived at the alighting point and the lost article is determined to be present, estimating whether or not the passenger intends to recover the lost article based on a behavior of the passenger detected by the sensor, including whether or not a gaze of the passenger is directed toward the lost article;

maintaining a closed state of a door when the passenger is estimated to intend to recover the lost article, and releasing the closed state of the door when the passenger is estimated not to intend to recover the lost article; and releasing the closed state of the door when the vehicle is determined to have arrived at the alighting point and the lost article is determined not to be present.

15. A lost article prevention method comprising causing a control to execute:

acquiring alighting point information from a communication device configured to receive the alighting point information being information of an alighting point of a passenger;

determining whether or not a lost article of the passenger is present in a vehicle cabin on a basis of a detection result of a sensor configured to detect a state inside the vehicle cabin;

determining whether or not a vehicle has arrived at the alighting point on a basis of the alighting point information;

when the vehicle is determined to have arrived at the alighting point and the lost article is determined to be present, estimating whether or not the passenger intends to recover the lost article based on a behavior of the passenger detected by the sensor, including whether or not a gaze of the passenger is directed toward the lost article;

maintaining a closed state of a door when the passenger is estimated to intend to recover the lost article, and releasing the closed state of the door when the passenger is estimated not to intend to recover the lost article; and releasing the closed state of the door when the vehicle is determined to have arrived at the alighting point and the lost article is determined not to be present.

* * * * *